(12) United States Patent
Maeda et al.

(10) Patent No.: US 7,605,380 B2
(45) Date of Patent: Oct. 20, 2009

(54) RADIATION IMAGE CONVERSION PANEL

(75) Inventors: Keiko Maeda, Tokyo (JP); Tetsuo Shima, Tokyo (JP)

(73) Assignee: Konica Minolta Medical & Graphics, Inc., Tokyo (JP)

( * ) Notice: Subject to any disclaimer, the term of this patent is extended or adjusted under 35 U.S.C. 154(b) by 0 days.

(21) Appl. No.: 11/955,569

(22) Filed: Dec. 13, 2007

(65) Prior Publication Data
US 2009/0001285 A1  Jan. 1, 2009

(30) Foreign Application Priority Data
Dec. 21, 2006  (JP)  ............... 2006-344064

(51) Int. Cl.
*G01J 1/58*  (2006.01)

(52) U.S. Cl. .................................. 250/483.1

(58) Field of Classification Search ............... 250/484.4
See application file for complete search history.

(56) References Cited

U.S. PATENT DOCUMENTS

2006/0076525 A1*  4/2006  Lamotte et al. ............. 250/580

FOREIGN PATENT DOCUMENTS

JP  2005-024272  1/2005

* cited by examiner

*Primary Examiner*—David P Porta
*Assistant Examiner*—Shun Lee
(74) *Attorney, Agent, or Firm*—Lucas & Mercanti, LLP

(57) ABSTRACT

Disclosed is a radiation image conversion panel comprising on a support a vapor-deposited photostimulable phosphor layer containing an alkali metal halide phosphor, wherein the surface element composition of the alkali metal halide phosphor exhibits a ratio of alkali metal to halide of 1.0 to 1.5.

14 Claims, 2 Drawing Sheets

RADIATION IMAGE CONVERSION PANEL

This application claims priority from Japanese Patent Application No. JP2006-344064 filed on Dec. 21, 2006, which is incorporated hereinto by reference.

FIELD OF THE INVENTION

The present invention relates to a radiation image conversion panel.

BACKGROUND OF THE INVENTION

In conventional radiation image conversion panels, the surface and/or the side-face of a vapor-deposited phosphor crystal, differing from the interior of the crystal, are exposed in various environments.

For instance, temperature change, or adsorption or desorption of inert gases occurs during vapor deposition and the subsequent steps are affected by a surface treatment or environmental moisture.

Specifically, there were produced problems that the crystal surface/side-face of a phosphor easily deteriorated in luminance and coalescence of columnar crystals due to the foregoing effects, resulting in deteriorated performance.

There have been few reports regarding the surface state which is considered to be essential in performance. There was a report defining the ratio of Cs to C, as described in, for example, JP-A No. 2005-24272 (hereinafter, the term JP-A refers to Japanese Patent Application Publication), which targeted reduction of staining on the crystal surface and was not studied of the composition of the crystal.

SUMMARY OF THE INVENTION

Accordingly, it is an object of the invention to obtain a radiation image conversion panel exhibiting enhanced luminance and sharpness and superior aging stability.

One aspect of the invention is directed to a radiation image conversion panel comprising on a support a vapor-deposited photostimulable phosphor layer containing an alkali metal halide phosphor, wherein the surface element composition of the alkali metal halide phosphor exhibits a ratio of alkali metal to halide of 1.0 to 1.5.

Another aspect of the invention is directed to a manufacturing method of the radiation image conversion panel.

DETAILED DESCRIPTION OF THE INVENTION

The radiation image conversion panel relating to the invention, will be explained with reference to FIG. 1.

Figure 1:
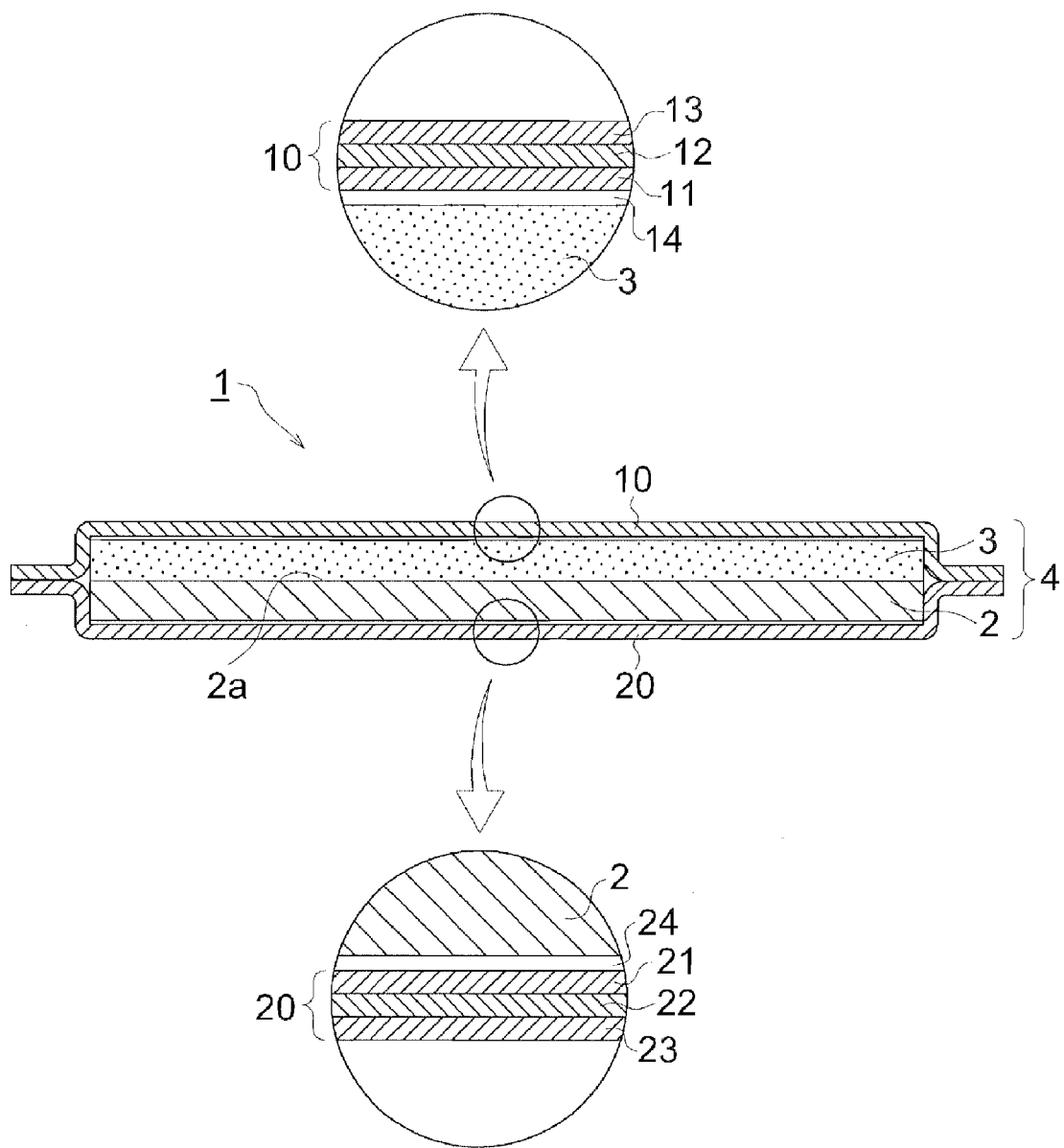
FIG. 1 illustrates a sectional view showing one embodiment of the radiation image conversion panel.

FIG. 1 illustrates a sectional view showing one embodiment of the radiation image conversion panel. As shown in FIG. 1, a radiation image conversion panel 1 comprises a phosphor plate 4 having, on a support 2, a photostimulable phosphor layer 3 containing an alkali metal halide phosphor.

The support, which is preferably in a rectangular form, formed of a polymer material, glass or a metal, and specific examples thereof include organic polymer film such as cellulose acetate film, polyester film, polyethylene terephthalate film, polyamide film, polyimide film, triacetate film or polycarbonate film; plate glass of quartz/borosilicate glass or chemically reinforced glass; a metal sheet of aluminum, iron, copper or chromium, or a metal oxide-coated metal sheet. Of these, organic polymer film is preferred in terms of X-ray transmittance and suitability for cutting.

The surface (2a) of the support 2 may be a smooth surface or a matte surface. Further, the surface (2a) of the support 2 may be a matte surface to achieve enhanced adhesion to the photostimulable phosphor layer 3 or may be provided with a sublayer on the surface (2a) to achieve enhanced adhesion to the photostimulable phosphor layer 3. Alternatively, there may be provided a light reflective layer (not shown in the figure) on the surface (2a) to prevent exciting light being incident to the phosphor layer 3 through the support 2.

The phosphor layer 3 preferably has a layer structure of at least one layer and the layer thickness is preferably not less than 50 μm and more preferably from 100 to 500 μm.

The phosphor layer 3 preferably has a columnar structure in which a large number of columnar crystals are arranged at intervals.

Alkali Metal Halide Phosphor

In the following, there will be described an alkali metal halide phosphor contained in the photostimulable phosphor layer of the radiation image conversion panel of the invention.

As a result of study by the inventors, it was discovered that chemical optimization of the crystal surface of a phosphor, specifically an alkali metal halide phosphor having a surface element composition exhibiting an alkali metal/halide ratio of 1.0-1.5 resulted in a phosphor crystal of high performance. The alkali metal/halide ratio is preferably from 1.1 to 1.4.

In the alkali metal halide phosphor, the main halide component is preferably Br or I and the fluorine content is preferably from 0 ppm to 10 ppm, whereby further enhanced effects of the invention are realized.

Alkali Metal/Halide Ratio:

The ratio of alkali metal to halide (hereinafter, also denoted as alkali/halide ratio) was measured in X-ray photoelectron spectroscopy by using XPS apparatus (ESCALAB 200R, produced by VG Co.). Measurement conditions were as follows:

Anode: Al (monochromator)/180 W (18 kV)
Pass energy: 150 V
Take off angle: 90°

Measurement of surface composition was conducted at room temperature. The surface composition concentration (in atom %) was determined from a peak area and an ionization cross-section area. The ratio of alkali metal (atom %) to halide (atom %) was defined as an alkali metal/halide (or alkali/halide ratio). In the case when two or more halides are contained, the sum thereof is used.

In the invention, it is preferred that an alkali metal halide phosphor has a main halide component of Br or I and having a fluorine content of from 0 to 10 ppm. Herein, the main halide component refers to a halide component accounting for at least 50% by mass of the total halide content. Thus, in the alkali metal halide phosphor of the invention, it is preferred that Br or I accounts for at least 50% by mass of total halide component.

Identification of a main halide component of a phosphor and determination of fluorine content of the halide were conducted via ion chromatography.

Quantitative determination of the main halide component was conducted in the manner that 100 mg of a sample was dissolved in ultrapure water to make 100 ml, further diluted with ultrapure water, and subjected to anion gradient analysis by using DX-500 produced by DIONEX Co.

The fluorine content was determined in such a manner that 250 mg of a sample was dissolved in ultrapure water to make 25 ml and Br ions that interfered in a solid phase cartridge (On Guard-Ag, produced by DIONEX Co.) were removed. Subsequently, anion gradient analysis was conducted in DX-500 produced by DIONEX Co.

Anion chromatography: DX-500, produced by DIONEX Co.
Separation column: Ion Pac AS11
Guard column: Ion Pac AS11, produced by DIONEX Co.
Eluate: A; ultrapure water
  B; 100 ml NaoH

|  | Time (min) | | | | | |
|---|---|---|---|---|---|---|
|  | 0 | 1 | 5 | 15 | 25 | 35 |
| A (%) | 99 | 99 | 98 | 88 | 70 | 70 |
| B (%) | 1 | 1 | 2 | 12 | 30 | 30 |

Flow rate: 1 ml/min
Suppresser: ASRS-ULTRA (300 mA)
Mode: External mode
Reclaimed liquid: Ultrapure water (supplied by high-pure nitrogen at 10 psi)
Detection: Electrical conduction detection Alkali Metal Halide Phosphor:

Alkali metal halide phosphors usable in the invention are preferably a compound represented by the following formula (1).

$$M^1X \cdot aM^2X'_2 \cdot bM^3X''_3 : eA$$ 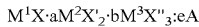

In formula (1), $M^1$ is an alkali metal atom selected from Li, Na, K, Rb and Cs, preferably an alkali metal atom selected from K, Rb and Cs, and more preferably Cs.

$M^2$ is a divalent metal atom selected from Be, Mg, Ca, Sr, Ba, Zn, Cd, Cu and Ni and preferably a divalent metal atom selected from Be, Mg, Ca, Sr and Ba.

$M^3$ is a tri-valent metal atom selected from Sc, Y, La, Ce, Pr, Nd, Pm, Sm, Eu, Gd, Tb, Dy, Ho, Er, Tm, Yb, Lu, Al, Ga and In, and preferably a tri-valent metal atom selected from Y, La, Ce, Sm, Eu, Gd, Lu, Al, Ga and In.

X, X' and X" are each a halogen atom selected from F, Cl, Br and I, and preferably a halogen atom selected from Br and I.

A is a metal atom selected from Eu, Tb, In, Ca, Cs, Ce, Tm, Dy, Pr, Ho, Nd, Yb, Er, Gd, Lu, Sm, Y, Tl, Na, Ag, Cu and Mg, and preferably a metal atom selected from Eu, Cs, Sm, Tl and Na.

In the formula (1), a, b and e are each a numerical value falling within the range of $0 \leq a < 0.5$, $0 \leq b < 0.5$ and $0 < e \leq 0.2$; and b is more preferably a numerical value falling within the range of $0 \leq b \leq 10^{-2}$.

The compound of formula (1) is preferably a compound represented by the following formula (2), and CsBr:Eu is specifically preferred.

 $$CsX:eA$$  Formula (2)

wherein X is F, Cl, Br or I; A is Eu, In, Ga or Ce and e is the same as defined in formula (1). Specifically, Eu as an activator, which results in enhanced X-ray conversion efficiency, is preferred.

Manufacture of Alkali Metal Halide Phosphor:

Alkali metal halide phosphors of the foregoing formula (1) or (2) can be manufactured by using, for example, phosphor raw materials (a) to (d):

(a) one or more compounds selected from LiF, LiCl, LiBr, LiI, NaF, NaCl, NaBr, NaI, KF, KCl, KBr, KI, RbF, RbCl, RbBr, RbI, CsF, CsCl, CsBr and CsI;

(b) one or more compounds selected from $BeF_2$, $BeCl_2$, $BeBr_2$, $BeI_2$, $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $BeNiBr_2$ and $NiI_2$;

(c) one or more compounds selected from $ScF_3$, $ScCl_3$, $ScBr_3$, $ScI_3$, $YF_3$, $YCl_3$, $YBr_3$, $YI_3$, $LaF_3$, $LaCl_3$, $LaBr_3$, $LaI_3$, $CeF_3$, $CeCl_3$, $CeBr_3$, $CeI_3$, $PrF_3$, $PrCl_3$, $PrBr_3$, $PrI_3$, $NdF_3$, $NdCl_3$, $NdBr_3$, $NdI_3$, $PmF_3$, $PmCl_3$, $PmBr_3$, $PmI_3$, $SmF_3$, $SmCl_3$, $SmBr_3$, $SmI_3$, $EuF_3$, $EuCl_3$, $EuBr_3$, $EuI_3$, $GdF_3$, $GdCl_3$, $GdBr_3$, $GdI_3$, $TbF_3$, $TbCl_3$, $TbBr_3$, $TbI_3$, $DyF_3$, $DyCl_3$, $DyBr_3$, $DyI_3$, $HoF_3$, $HoCl_3$, $HoBr_3$, $HoI_3$, $ErF_3$, $ErCl_3$, $ErBr_3$, $ErI_3$, $TmF_3$, $TmCl_3$, $TmBr_3$, $TmI_3$, $YbF_3$, $YbCl_3$, $YbBr_3$, $YbI_3$, $LuF_3$, $LuCl_3$, $LuBr_3$, $LuI_3$, $AlF_3$, $AlCl_3$, $AlBr_3$, $AlI_3$, $GaF_3$, $GaCl_3$, $GaBr_3$, $GaI_3$, $InF_3$, $InCl_3$, $InBr_3$ and $InI_3$;

(d) one or more metal atoms selected from Eu, Tb, In, Ga, Ce, Tm, Dy, Pr, Ho, Nd, Yb, Er, Gd, Lu, Sm, Y, Ti, Na, Ag, Cu and Mg.

Phosphor raw materials of (a) to (d) are weighed so as to meet the range of a, b and e of formula (1) and mixed with water, in which mixing may be carried out sufficiently using a mortar a ball mill, or a mixer mill.

The thus obtained raw material mixture is adjusted to a pH (C) in the range of $0 < C < 7$ by adding a prescribed acid and moisture is evaporated by distillation.

Further, the obtained raw material mixture is charged into a heat-resistant vessel such as a silica port, an alumina crucible or a silica crucible and then placed in an electric furnace to be calcined. The calcination temperature preferably is 500 to 1000° C. The calcination time, depending on a charging amount of raw materials, calcination temperature and the like, preferably is 0.5 to 6 hrs. As a calcinations atmosphere is employed a weakly reducible atmosphere such as a nitrogen gas atmosphere containing a small amount of hydrogen gas or a carbon dioxide atmosphere containing carbon monoxide, a nitrogen gas atmosphere, a neutral atmosphere such as an argon gas atmosphere, or a trace amount of oxygen-introduced weakly oxidizing atmosphere.

Using the foregoing alkali metal halide phosphor, as shown in FIG. 1, the stimulable phosphor layer 3 is formed and the phosphor plate 4 is constituted of the stimulable phosphor layer and the support 2.

To control the surface element composition of an alkali metal halide phosphor so that an alkali metal/halide ratio falls within the range of the invention, process conditions of phosphor deposition may be optimized but it can also be controlled by a post-treatment after deposition.

For instance, halogen gas may be introduced to perform direct substitution. Alternatively, halogen substitution may be performed by allowing a halogen-releasing agent to release a halogen through heating. Such halogen gas, which is HCl, HBr, HI or the like and exhibits strong corrosiveness, needs a specific vessel. Materials capable of releasing a halogen upon heating are usable as a halogen releasing agent, including, for example, a halogenated compound in which at least one hydrogen has been replaced by Cl, Br or I. Such a halogen releasing agent may be a saturated compound in which constituent elements are bonded through a saturated bonding or an unsaturated compound, may be a cyclic compound or a chain compound, in which an atom or a group may be replaced by a hydroxy group, an ether group, a carbonyl group or a carboxy group.

Formation of Phosphor Layer

Techniques for providing a phosphor layer containing a photostimulable alkali metal halide phosphor on a support include a vapor deposition method.

In the following will be described a vapor deposition method used for formation of a photostimulable phosphor layer of the radiation image conversion panel of the invention.

Techniques for vapor-depositing an alkali metal halide phosphor relating to the invention onto a support include a vacuum evaporation method, a sputtering deposition method and a CVD method.

Vacuum Evaporation:

Vacuum evaporation is conducted in such a manner that after placing a support in an evaporation apparatus, the inside of the apparatus is evacuated to a vacuum degree of $1.333 \times 10^{-4}$ Pa and subsequently, at least a stimulable phosphor is evaporated with heating by the resistance heating method or electron-beam method to cause the phosphor to be deposited at a slant on the surface of the support to a desired thickness. As a result, a photostimulable phosphor layer containing no binder is formed, provided that the foregoing evaporation stage may be divided into plural times to form the stimulable phosphor layer. In this evaporation stage, plural resistance heaters or electron beams may be used to perform vacuum evaporation.

Alternatively, raw material of a photostimulable phosphor is evaporated using plural resistance heaters or electron beams and the intended stimulable phosphor is synthesized on the support, simultaneously forming a stimulable phosphor layer.

Vacuum evaporation may be conducted while cooling or heating the substrate to be deposited thereon. After completion of vacuum evaporation, the stimulable phosphor layer may be subjected to a heating treatment.

Sputtering Deposition:

Sputter deposition is conducted in such a manner that after setting a support in a sputtering apparatus, the inside of the apparatus is evacuated to a vacuum level of $1.333 \times 10^{-4}$ Pa and then inert gas used for sputtering such as Ar and Ne is introduced therein at a gas pressure of ca. $1.333 \times 10^{-1}$ Pa, subsequently, sputtering is carried out with targetting the stimulable phosphor to cause the phosphor to be deposited on the slanted surface of the support so as to have a desired thickness. Similarly to the vacuum evaporation, the foregoing sputtering stage may be divided into plural times to form the stimulable phosphor layer, in which plural targets may be simultaneously or successively sputtered to form a photostimulable phosphor layer.

In the sputtering deposition, plural phosphor vaporization sources are targeted, which may be simultaneously or successively sputtered to form a photostimulable phosphor layer on a support. In sputtering deposition, a gas such as $O_2$ or $H_2$ may optionally be introduced to perform reactive vapor evaporation. Sputtering deposition may be conducted while cooling or heating the substrate to be deposited thereon. After completion of vacuum evaporation, the stimulable phosphor layer may be subjected to a heating treatment.

CVD:

In the CVD method, an organic metal compound containing an intended alkali metal halide phosphor as a vaporization source is decomposed by energy such as heat or electric high-frequency power to form a photostimulable phosphor layer containing no binder on the support (substrate).

In the foregoing vapor deposition methods, long columnar crystals are independently vapor-deposited at an inclination angle to the normal direction to form a photostimulable phosphor layer on the support.

The photostimulable phosphor layer thickness, depending on radiation sensitivity of the targeted radiation image conversion panel or the kind of a photostimulable phosphor, is preferably not less than 50 μm and more preferably from 100 to 500 μm.

Vapor Deposition Apparatus

Figure 2:
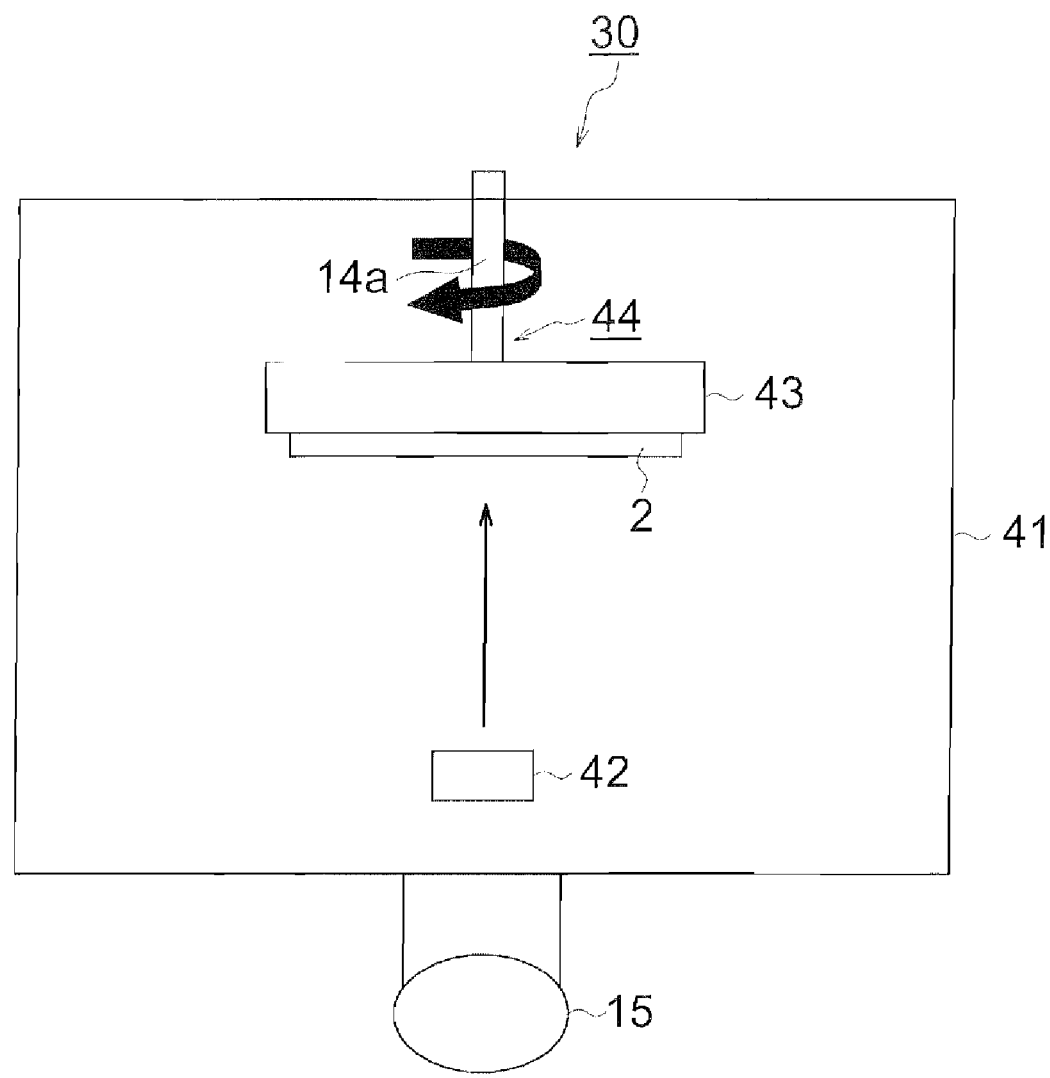
FIG. 2 illustrates one example a vapor deposition apparatus usable in the invention.

In the invention, vapor deposition is performed by using, for example, a vapor deposition apparatus, as shown in FIG. 2.

Vapor deposition apparatus 30 is provided with a vacuum vessel 41 and a vacuum pump 15 to evacuate the interior of the vacuum vessel 41 and to introduce atmospheric air; the interior of the vacuum vessel 41 is provided with an evaporation source 42 to deposit vapor onto a support provided inside the vacuum vessel 41, a support holder 43 to hold the support 2 and a support rotation mechanism 44 to allow the support holder 43 to rotate through a shaft 14a to the evaporation source 42.

In the vapor deposition apparatus 30, vapor from the evaporation source 42 is deposited onto the support 2 with rotating the support holder 43 by the support rotation mechanism 44.

To hold a stimulable phosphor and heat it by a resistance heating method, the evaporation source 42 may be composed of an aluminum crucible wound by a heater, or a boat or a heater of a high-melting metal. Besides the resistance heating method, electron beam heating or high-frequency 4 induction heating is also applicable to heat a stimulable phosphor. Specifically, the resistance heating is preferred in terms of having a relatively simple constitution, ease of handling and low price, and being applicable to a large number of materials. Further, the evaporation source 42 may be a molecular beam source using a molecular source epitaxial method.

There may be employed inert gases such as Ar or He to control the degree of vacuum.

There may also be provided a shutter between the support 2 and the evaporation source 42 to shield the space from the evaporation source 42 to the support 2. Providing the shutter prevents unintended material adhering onto the stimulable phosphor surface being evaporated at the initial stage of evaporation and its adherence to the support 2.

The support holder 43 is preferably provided with a heater to heat the support 2. Heating the surface of the support 2 can ablate or remove material adsorbed onto the support surface, prevent generation of an impurity layer between the support surface and the stimulable phosphor, promote closer contact and optimize film characteristics of the stimulable phosphor layer.

The support rotation mechanism 44 is composed of, for example, a rotating shaft 14a which rotates a support holder 43 while holding the support holder 43 and a motor (not shown in FIG. 2) which is arranged outside the vacuum vessel 41 and acts as a driving source for the rotating shaft.

In the following, there will be described an example of providing a photostimulable phosphor layer.

Using the vapor deposition apparatus 30 described above, a stimulable phosphor layer (3) can be formed on a support 2, according to the following procedure. First, the support 2 is mounted on the support holder 43. Then, the interior of the vacuum vessel 41 is evacuated and regulated to the intended degree of vacuum. Thereafter, the support holder is rotated toward the evaporation source 42 by the support rotation mechanism 44. When the vacuum vessel reaches the degree of vacuum allowing deposition, a stimulable phosphor is evaporated from the heated evaporation source 42 and is deposited onto the surface of the support 2 to grow the phosphor to the intended thickness. In this regard, the spacing between the support 2 and the evaporation source 42 preferably is from 100 mm to 1500 mm.

The foregoing deposition process may be divided to plural times to form a stimulable phosphor layer (3). Further, using plural resistance heaters or electron beams in the deposition process, co-deposition can be achieved to form the stimulable phosphor layer (3) concurrently with synthesis of the targeted stimulable phosphor on the support 2. The substrate [such as support (2), a protective layer or an interlayer] may optionally be cooled or heated during deposition. After completion of the deposition, the stimulable phosphor layer (3) may optionally be heated. Further, there may be conducted vapor deposition in which gases such as $O_2$ or $H_2$ are introduced during deposition.

In the formation of the stimulable phosphor layer (3) through gas-phase deposition, the support is preferably maintained at a temperature of from room temperature (also denoted as rt and approximately 24° C.) to 300° C., and more preferably 50 to 200° C. during the formation of the stimulable phosphor layer (12). The degree of vacuum (also denoted as P) is preferably $1.0 \times 10^{-3}$ Pa<P<$5.0 \times 10^{-1}$ Pa, and more preferably $3.0 \times 10^{-3}$ Pa<P<$3.0 \times 10^{-1}$ Pa.

The photostimulable phosphor layer 3 containing an alkali meta halide phosphor is thus formed, and the photostimulable phosphor layer 3 and the support 2 constitute a photostimulable phosphor plate 4.

There will be described a protective layer for use in the radiation image conversion panel of the invention, with reference to FIG. 1.

As shown in FIG. 1, a protective layer is provided for the purpose of protecting the phosphor plate 4 of the radiation image conversion panel 1.

The protective layer is comprised of two moisture-proof protective films. As is shown in FIG. 1, the phosphor plate 4 is disposed so that the first moisture-proof protective film 10 is provided on the upper side of the photostimulable phosphor layer 3 and the second moisture-proof protective film 20 is provided on the upper side of the support 2.

The first moisture-proof protective film 10 substantially is not in contact with the photostimulable phosphor layer 3 of the phosphor plate 4 and its circumference extends beyond the circumference of the phosphor plate 4. The first moisture-proof protective film 10 substantially not being in contact with the photostimulable phosphor layer 3 means that the first protective film 10 and the phosphor layer 3 are not optically unified. Specifically, the contact area between the first protective film 10 and the phosphor layer 3 is not more than 10% of the area of the surface of the phosphor layer 3 (or the surface opposing the first protective film 10). The circumference of the second moisture-proof protective film 20 also extends beyond the circumference of the phosphor plate 4.

In the radiation image conversion panel 1, the respective circumferences of the first and second moisture-proof protective films 10 and 20 are fused with each other over the overall circumference, whereby the phosphor plate 4 is completely sealed with the first and second moisture-proof protective films 10 and 20. Thus, the first and second moisture-proof protective films 10 and 20 seal the phosphor plate 4 and securely prevent moisture entering the phosphor plate 4 to protect the phosphor plate.

The moisture-proof protective film of the invention, which securely keeps moisture from entering, preferably exhibits an oxygen permeability of not more than $1 \times 10^{-3}$ ml/(m²·24 h·MPa), which is measured in accordance with JIS K 7126-1987 and a moisture permeability (25±0.5° C., 90±2% RH) of $1 \times 10^{-3}$ g/(m²·24 h), which is measured in accordance with JIS K 7129-1992.

As shown in the upper magnified view of FIG. 1, the first moisture-proof protective film 10 has a layer structure comprised of a first layer 11, a second layer 12 and a third layer 13.

The first layer 11 opposes the photostimulable phosphor layer 3 intervened with an air layer 14 and is composed of a heat-fusible resin. Examples of a heat-fusible resin include ethylene-vinyl acetate copolymer (EVA) and casting polypropylene (CPP).

The second layer 12 is composed of a metal oxide such as alumina or silica and is formed below the third layer 13 through vapor deposition. The second layer 12 is used for reinforcement of moisture-proofing capability of the first protective film.

The third layer 13 is provided on the second layer 12 and is composed of a resin such as polyethylene terephthalate (PET).

The first moisture-proof protective film 10 having the second layer 12 composed of a metal oxide is superior in workability and transparency and tends not to be influenced by temperature or humidity by its moisture-proofing or oxygen permeability. Accordingly, the first moisture-proof protective film 10 is suitable for the radiation image conversion panel 1 employing a photostimulable phosphor and for medical use which requires stable image quality, irrespective of environment.

On the third layer 13, there may be provided a layer similar to the first layer 11, a layer similar to the second layer 12, a layer similar to the third layer 13, or a layer composed of a resin different from the first layer 11 and the third layer 13.

When a layer similar to the second layer 12 composed of a metal oxide such as alumina or silica is provided on the third layer 13, the moisture-proof protective film 11 displays suitable moisture-proofing for the number of layers corresponding to the second layer 12.

The second layer 12 or a similar layer can be provided by conventional methods but in terms of workability preferably by a dry laminating system.

As shown in the lower magnified view of FIG. 1, the second moisture-proof protective film 20 has a layer structure comprised of a first layer 21, a second layer 22 and a third layer 23.

The first layer 21 is opposed to the support 2 of the phosphor plate 4 with being intervened with an air layer 24. The first layer 21 is constituted similarly to the first layer 11 of the first moisture-proof protective film 10 and its circumference is fused with the first layer 11 of the first moisture-proof protective film 10.

The second layer 22 is a layer laminated with the first layer 21 and composed of aluminum. The second layer 22 is used for enhancement of moisture-proofing in the second moisture-proof protective film 20.

The third layer 23 is provided below the second layer 22 and is composed of a resin such as PET.

Below the third layer 23, there may be provided a layer similar to the first layer 21, a layer similar to the second layer 22, a layer similar to the third layer 23, or a layer composed of a resin different from the first layer 21 and the third layer 23.

EXAMPLES

The present invention will be further described with reference to examples but is by no means limited to these.

Example 1

Radiation Image Conversion Panel 1

On one side of a 200 μm thick support of polyimide was vapor-deposited an alkali metal halide phosphor (CsBr: 0.0005Eu) to form a photostimulable phosphor layer.

Using the vapor deposition apparatus, an alkali metal halide phosphor (CsBr:0.0005Eu) to be deposited was charged into an indirect heating crucible, and the support was placed onto a rotatable support holder and the spacing between the support and the evaporation source was adjusted to 500 mm. Subsequently, the inside of the vapor deposition apparatus was evacuated and then, argon (Ar) gas was introduced thereto to adjust the degree of vacuum to $5.0 \times 10^{-3}$ Pa; thereafter, the support was maintained at a temperature of 100° C., while rotating the support at a rate of 10 rpm. Subsequently, the indirect-heating crucible was heated to vaporize the phosphor and deposition was completed when the thickness of the stimulable phosphor layer reached 120 Mm.

The support having thereon an alkali metal halide phosphor (CsBr:0.0005Eu) was promptly placed into a conventional incubator (solids were also set into a heat-resistant vessel within the incubator) and incuvated at 140° C. for 2 hrs. in the atmosphere.

The thus treated phosphor layer was immediately opposed to a CPP (casting polypropylene) layer of the first moisture-proof protective film and the CPP layer of the second moisture-proof protective film was opposed to the other surface of the support having the phosphor layer. Then, the first and second moisture-proof protective films were superposed as such.

Thereafter, while evacuating the space surrounded by the first and second moisture-proof protective films, the circumference of the first and second moisture-proof protective films was fused by an impulse sealer to seal the alkali metal phosphor (CsBr:0.0005Eu) within the first and second moisture-proof protective films. Radiation image conversion panel 1 was thus prepared.

Radiation Image Conversion Panel 2

Radiation image conversion panel 2 was prepared similarly to the foregoing radiation image conversion panel 1, provided that the temperature of the support was maintained at 70° C.

Radiation Image Conversion Panels 3-8

Radiation image conversion panels 3 was prepared similarly to the foregoing radiation image conversion panel 1, provided that the alkali halide phosphor was incubated in an atmosphere of nitrogen gas under pressure.

Radiation image conversion panels 4 was prepared similarly to the foregoing radiation image conversion panel 1, provided that the alkali halide phosphor was incubated in an atmosphere of chlorine gas.

Radiation image conversion panels 5 was prepared similarly to the foregoing radiation image conversion panel 1, provided that the alkali halide phosphor was incubated in an atmosphere of iodine gas.

Radiation image conversion panels 6 was prepared similarly to the foregoing radiation image conversion panel 1, provided that the alkali halide phosphor was incubated in an atmosphere of bromine gas.

Radiation image conversion panels 7 was prepared similarly to the foregoing radiation image conversion panel 1, provided that a tantalum boat was used in place of the crucible.

Radiation image conversion panels 8 was prepared similarly to the foregoing radiation image conversion panel 1, provided that the alkali halide phosphor was incubated in the presence of pyridinium bromide perbromide as a bromine releasing agent.

The thus obtained radiation image conversion panels 1-8 were each evaluated with respect to alkali metal/halide ratio, emission luminance and sharpness, as below. The emission luminance and the sharpness were each evaluated immediately after preparation of the panels and after aged at 23° C. and 80% RH for 6 hrs.

Alkali Metal/Halide Ratio:

The surface of each of the phosphor samples was measured in XPS (X-ray photoelectron spectroscopy) to determine the surface composition. The obtained alkali content (Cs), divided by the halide content (Br) was defined as the alkali metal/halide ratio. The measurement was conducted using ESCA Lab200R (produced by VG Co.). The contents of Cs and Br were determined using a 3d5 peak.

Emission Luminance:

Emission luminance was determined according to the procedure as below.

Each sample was exposed to X-rays at a tube voltage of 80 kV from the back surface of the sample (being the side opposite the photostimulable phosphor). Then, a semiconductor laser scanned the surface (of the phosphor layer side) of each sample to excite the photostimulable phosphor layer and the amount of light (light intensity) of stimulated emission emitted from the photostimulable phosphor layer was measured by a detector (photomultiplier exhibiting a spectral sensitivity of S-5) and the measured value was defined as the luminance (or emission luminance). Measurement results are shown in Table 1, in which a luminance (emission luminance) was represented by a relative value, based on the luminance of radiation image conversion panel 1 (Sample 1) being 100.

Sharpness

Each sample was exposed through a MTF chart to X-rays at a tube voltage of 80 kV from the back surface of the sample (being the side opposite the photostimulable phosphor). Then, a semiconductor laser scanned the surface (of the phosphor layer side) of each sample to excite the photostimulable phosphor layer. Further, the amount of light (light intensity) of stimulated emission emitted from the photostimulable phosphor layer was measured by a detector (namely, a photomultiplier exhibiting a spectral sensitivity of S-5) and converted to electric signals. The electric signals were subjected to analog/digital conversion and recorded on a hard disc. The record on the hard disc was analyzed by a computer to calculate the MTF (modulation transfer function) of the X-ray image recorded on the hard disc. The results are shown in Table 1. Sharpness (namely, the MTF value) was relatively evaluated, based on the sharpness of radiation image conversion panel 1 (Sample 1) being 100.

Aging Characteristics

Aging characteristics of each sample were evaluated with respect to aging stability in the manner as below.

Each panel sample which was evaluated with respect to emission luminance and sharpness as described above, was aged in an incubator at 40° C. and 90% RH for 7 days and then evaluated again with respect to emission luminance and sharpness. Results are shown in Table 1.

TABLE 1

| Sample No. | Support | A (atom %) | B (atom %) | A/B | Fresh Luminance | Fresh Sharpness | Aging(*) Luminance | Aging(*) Sharpness | Remark |
|---|---|---|---|---|---|---|---|---|---|
| 1 | PI | 59 | 40 | 1.5 | 100 | 100 | 100 | 100 | Inv. |
| 2 | PI | 59 | 40 | 1.5 | 100 | 100 | 100 | 100 | Inv. |
| 3 | PI | 57 | 43 | 1.3 | 120 | 103 | 115 | 105 | Inv. |
| 4 | PI | 50 | 50 | 1.0 | 138 | 105 | 130 | 125 | Inv. |
| 5 | PI | 55 | 45 | 1.2 | 140 | 105 | 135 | 128 | Inv. |
| 6 | PI | 53 | 47 | 1.1 | 146 | 106 | 136 | 119 | Inv. |
| 7 | AL | 67 | 33 | 2.0 | 95 | 90 | 60 | 85 | Comp. |
| 8 | AL | 48 | 52 | 0.9 | 80 | 106 | 45 | 95 | Comp. |

PI: Polyimide, AL: Aluminum, A: Alkali metal, B: Halide
(*) After aged at 40° C. and 90% RH for 7 days As apparent from Table 1, it was proved that radiation image conversion panels 1-6 exhibited superior luminance and sharpness and improved aging stability, as compared to samples 7 and 8.

What is claimed is:

1. A radiation image conversion panel comprising on a support a vapor-deposited phosphor layer containing an alkali metal halide phosphor, wherein the phosphor layer exhibits a surface element composition having a ratio of alkali metal to halide of from 1.0 to 1.5.

2. The radiation image conversion panel of claim 1, wherein the ratio of alkali metal to halide is from 1.1 to 1.4.

3. The radiation image conversion panel of claim 1, wherein the phosphor layer has a thickness of 100 to 500 μm.

4. The radiation image conversion panel of claim 1, wherein the phosphor layer comprises columnar crystals of the alkali metal halide phosphor.

5. The radiation image conversion panel of claim 1, wherein the alkali metal halide phosphor has a main halide component of Br or I, and having a fluorine content of from 0 to 10 ppm.

6. The radiation image conversion panel of claim 1, wherein the alkali metal halide phosphor is CsBr:eEu in which e is $0<e=0.2$.

7. The radiation image conversion panel of claim 1, wherein the support is a polymer material film.

8. A method of manufacturing a radiation image conversion panel comprising on a support a phosphor layer containing an alkali metal halide phosphor, the method comprising:
vapor-depositing the alkali metal halide phosphor on the support to form the phosphor layer,
wherein the phosphor layer exhibits a surface element composition having a ratio of alkali metal to halide of from 1.0 to 1.5.

9. The method of claim 8, wherein the ratio of alkali metal to halide is from 1.1 to 1.4.

10. The method of claim 8, wherein the phosphor layer has a thickness of 100 to 500 μm.

11. The method of claim 8, wherein the phosphor layer comprises columnar crystals of the alkali metal halide phosphor.

12. The method of claim 8, wherein the alkali metal halide phosphor has a main halide component of Br or I, and having a fluorine content of from 0 to 10 ppm.

13. The method of claim 8, wherein the alkali metal halide phosphor is CsBr:eEu in which e is $0<e=0.2$.

14. The method of claim 8, wherein the support is a polymer material film.

* * * * *